United States Patent [19]

Aizawa et al.

[11] Patent Number: 4,858,150

[45] Date of Patent: Aug. 15, 1989

[54] SHAPE MODELING SYSTEM

[75] Inventors: Tamio Aizawa; Kyoji Takahara, both of Ibaraki, Japan

[73] Assignee: Hitachi, Ltd., Tokyo, Japan

[21] Appl. No.: 25,979

[22] Filed: Mar. 16, 1987

[30] Foreign Application Priority Data

Jun. 27, 1986 [JP] Japan ................... 61-149531

[51] Int. Cl.[4] .............................................. G06F 15/20
[52] U.S. Cl. ..................... 364/522; 364/521; 340/724
[58] Field of Search ............... 364/521, 522, 518; 340/747, 750, 732, 723, 724

[56] References Cited

U.S. PATENT DOCUMENTS 4,498,139  2/1985  Malinovsky ..................... 364/518
4,685,070  8/1987  Flinchbaugh .................... 364/522

OTHER PUBLICATIONS

Nakazawa, N. "Interactive Design System for Structure Analysis and Strength Evaluation: Hidess", Computers in Engineering 82, pp. 55–61.

Preiss et al., "Solving CAD/CAM Problems by Heuristic Programming", Computers in Mechanical Eng., pp. 56–60.

Takala, T. "User Interface Management System with Geometric Modeling Capability: A CAD Systems Framework", IEEE CG&A, 4/85, pp. 42–50.

Calkins et al., "Computer Graphics and Animation Come to Ship Designing Computers in Mechanical Engineering", Jul. 84, pp. 32–42.

Aldefeld, B. "An Automatic Recognition of 3D Structures from 2D Representations" Computer Aided Design, vol. 15, No. 2.

Calkins, D. E. "An Automated Sculpted Surface CAD Procedure Based on High Level Computer Graphics and Expert Systems", Computers in Engineering 1985, pp. 119–126.

Ganter, M. A. "From Wire-Frame to Solid-Geometric: Automated Conversion of Data Representations", Computers in Mechanical Engineering 9/83, pp. 40–45.

*Primary Examiner*—Gary V. Harkcom
*Assistant Examiner*—Phu K. Nguyen
*Attorney, Agent, or Firm*—Antonelli, Terry & Wands

[57] ABSTRACT

A shape modeling method of the interactive operation type for generating a 3-dimensional shape of an object using 2-dimensional wire-frame figures formed by a drawing system, which inputs 2-dimensional coordinate system data of a hierarchical structure that can be drawn into 2-dimensional wire-frame figures.

9 Claims, 13 Drawing Sheets (FIGURE DISPLAY)

(2-D WIRE-FRAME DISPLAY)

(PLANE DEFINITION (3-D TRANSFORMATION) DISPLAY)

(COORDINATE SYSTEM DISPLAY)

(PLANE SOLID TRANSFORMATION DISPLAY)

(PLANE DEFINITION (3-D PLANE MAKING) DISPLAY)

SHAPE MODELING SYSTEM

BACKGROUND OF THE INVENTION

This invention relates to shape modeling which forms the nucleus in organizing automated systems for the design and manufacturing activities using computers, such as CAE, CAD and CAM systems and the drawing process activity using office automation facilities, and particularly to a shape modeling system suitable for interactive operation.

In conventional shape modeling systems using a method of generating data of 3-dimensional shape of an object from data of 2-dimensional figures represented by drawings produced by a drawing system, a 3-dimensional shape is formed by combining "3-views" including a front view, plan view and side view conformed to a mechanical drawing standard such as JIS, and the drawing method for these 2-dimensional figures has been limited.

An example of the above-mentioned shape modeling systems is described in a publication entitled "COMPUTERS IN ENGINEERING" Vol. 1, pp. 55–61, published in 1982 by THE AMERICAN SOCIETY OF MECHANICAL ENGINEERS.

The above prior art system could not produce data of a 3-dimensional shape from data of 2-dimensional figures having a hierarchical structure in many stages dealt with by the mechanical drawing standard, and the method of drawing 2-dimensional figures with the intention of producing a 3-dimensional shape has been confined to the drawing method of 3-face views. On this account, the drawing method for 2-dimensional figures based on the mechanical drawing standard familiar to designers could not be utilized effectively as a data input means of the system. In addition, existing drawing data produced by a drawing system or the like cannot be utilized effectively as basic data for producing data of 3-dimensional shape, and this has been a problem in improving the performance of man-machine interface.

SUMMARY OF THE INVENTION

An object of the present invention is to provide a shape modeling system capable of producing data of 3-dimensional shape from data of 2-dimensional figures having a hierarchical structure with many stages dealt with in the mechanical drawing standards.

The above objective is achieved by the steps of operation as follows. For each 2-dimensional figure forming a view element, data of 2-dimensional coordinate system element representative of a local coordinate system defined for a generation object shape determined from two sets of 2-dimensional figures and of a tree structure extending to a main coordinate system defined for the generation object shape is generated. By providing data of a finite plane expressed in a 2-dimensional shape having the generated 2-dimensional coordinate system element and data of line element forming another 2-dimensional figure having a 2-dimensional coordinate system element indicative of as to which plane the finite plane resulted from by projection, data of generation object 3-dimensional plane element is generated. Finally, the generated data of 3-dimensional plane element and data of a 3-dimensional plane model generated in advance are matched.

When the operator enters data of coordinate axis element on a 2-dimensional figure, the computational unit generates data of 2-dimensional coordinate system element, produces 3-dimensional coordinate system element and its tree structure from data of 2-dimensional coordinate system element on two sets of 2-dimensional figures, and stores the resulting data in the data base. After the operator has selected a command and entered certain parameters, the computational unit is activated to generate data of a 3-dimensional shape using the parameters entered by the operator and data of 2-dimensional figure, 2-dimensional coordinate system element, 3-dimensional coordinate system element and its tree structure.

DESCRIPTION OF THE PREFERRED EMBODIMENT

Figure 1:
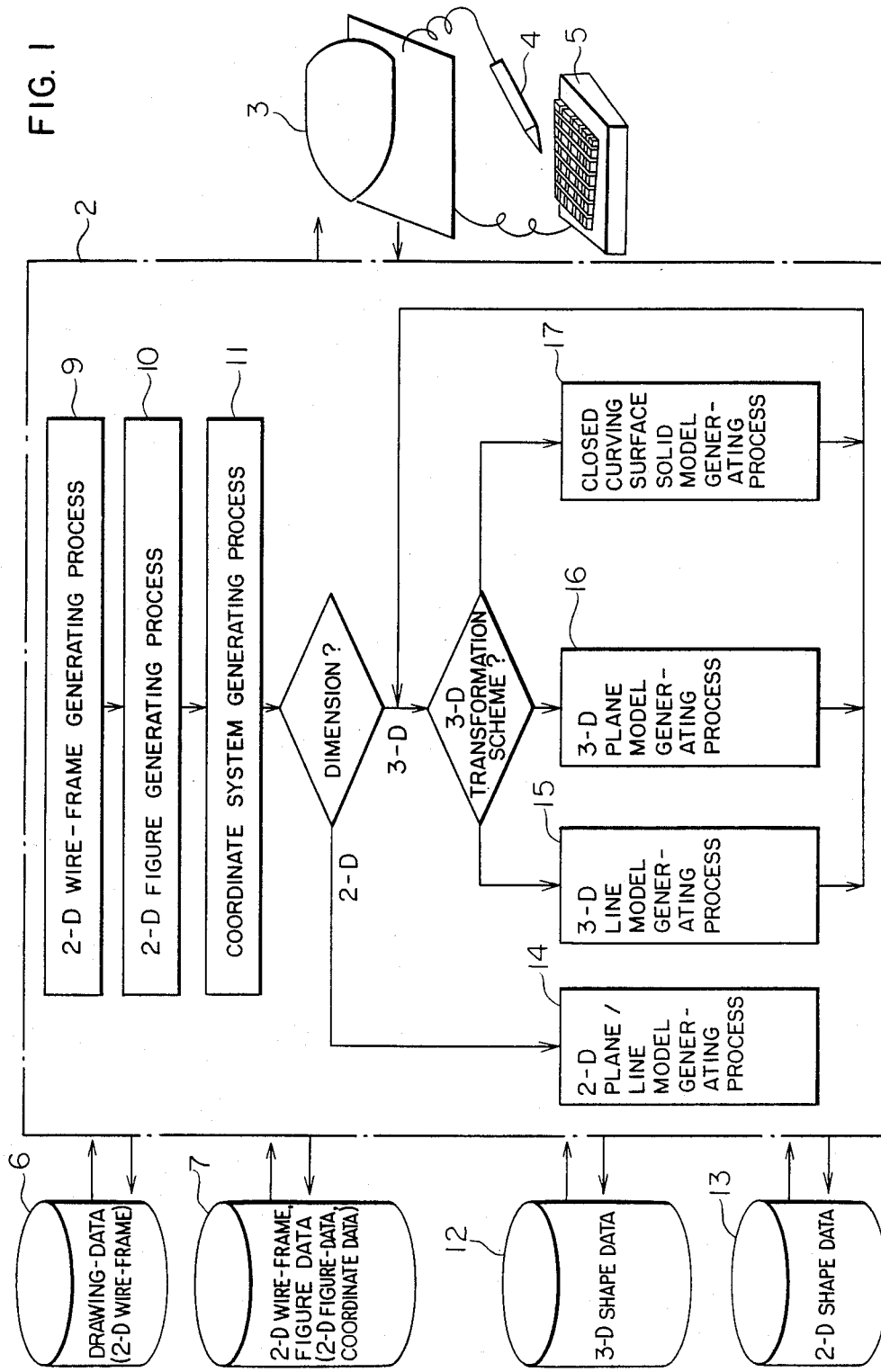
FIG. 1 is a flowchart showing the overall process of generating a 3-dimensional stereographic shape by the interactive shape modeling system embodying the present invention.

An embodiment of this invention will now be described with reference to the drawings.

A. BASIC CONFIGURATION OF THE SYSTEM

The inventive shape modeling system is designed to enter commands and parameters through input means including a graphic display unit 3, a tablet and stylus 4 and a keyboard 5 and operate on a computational unit 2 to produce data of 2-dimensional (will be termed simply "2-D" hereinafter) wire frame in a 2-D wire-frame generating process 9 and store the result in a data base 6.

Next, a 2-D figure generating process 10 operates on the computational unit 2 to generate data of a 2-D figure (such as providing line elements that are elements of the 2-D wire-frame with identification data for 2-D figure including the line elements) using the 2-D wire-frame data generated in the 2-D wire-frame generating process 9, and store the generated 2-D figure data in a data base 7.

Next, a 2-D coordinate system generating process 11 operates on the computational unit 2 to retrieve the 2-D figure data from the data base 7 and generate data of 2-D coordinate system element (such as two sets of coordinate axis elements) which belongs to the 2-D figure element.

The computational unit 2 is operated on to store the data of 2-D figure and 2-D coordinate system (they will be called integrally "2-D wire-frame figure") produced in the processes 9, 10 and 11 in the data base 7.

Next, the data base 7 operates on the input means 4 and 5 and the computation unit 2 to retrieve the 2-D figure data, which is used by a 2-D plane/line model generating process 14 to produce a 2-D shape model, and the resulting 2-D shape data is stored in a data base 13. Alternatively, a 3-dimensional (will be termed simply "3-D" hereinafter) line model generating process 15, 3-D plane model generating process 16 and closed surface solid model generating process 17 produce a 3-D shape model, and the resulting shape model data is stored in a data base 12.

B. 3-D MODEL GENERATING PROCESS

The 3-D plane model generating process which is much common in the shape model generating process in FIG. 1 will be described for the case of an interactive operating system with reference to FIG. 2 and FIGS. 3–8.

B1. OUTLINE OF INTERACTIVE OPERATING PROCESS

Figure 2:
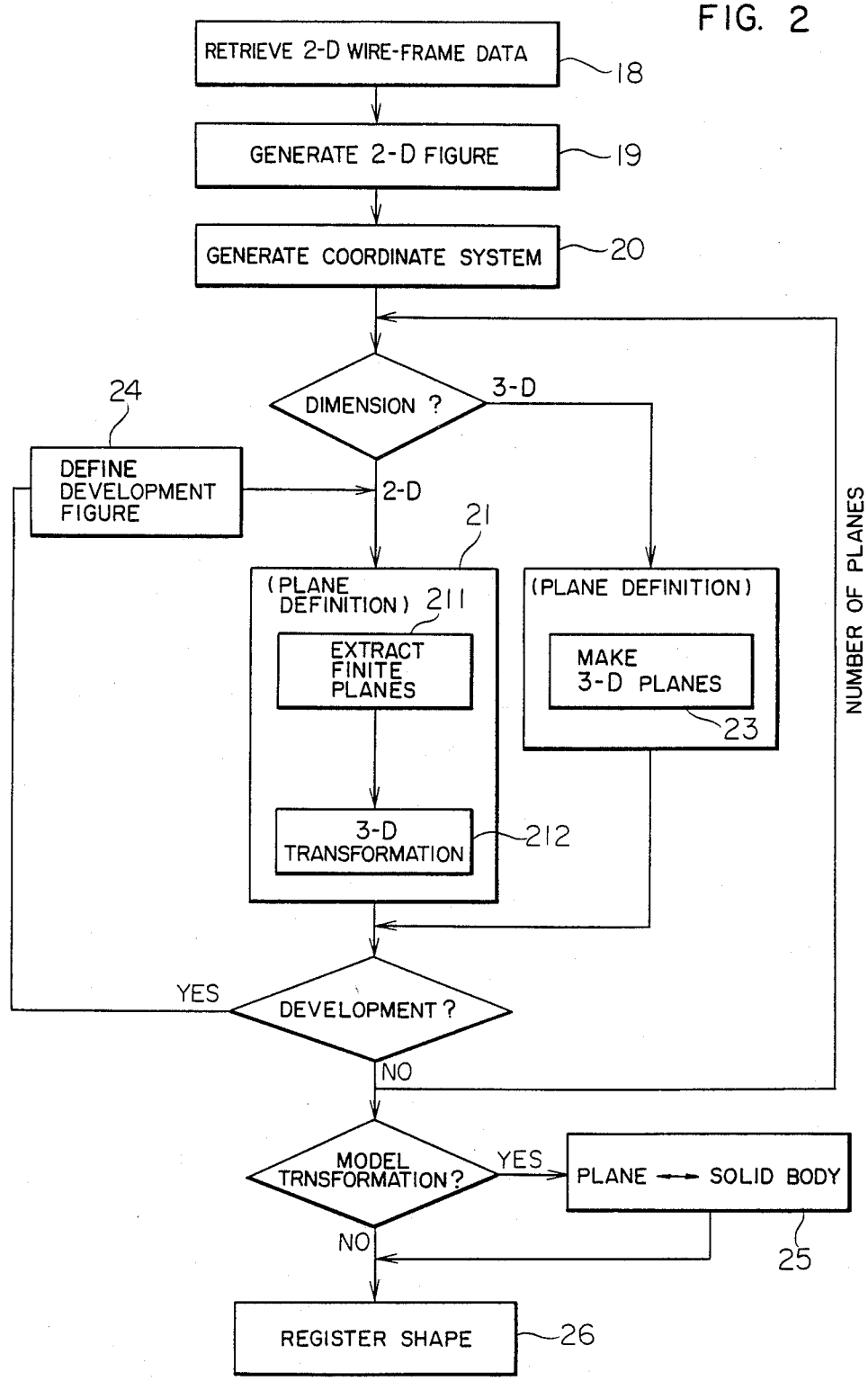
FIG. 2 is a flowchart showing a common process implemented by each of the 3-dimensional stereographic shape generating steps in FIG. 1.

The process of generating a 3-D plane model using 2-D wire-frame data includes the command processing steps shown in FIG. 2.

Figure 3:
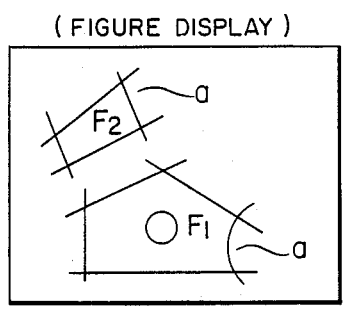
FIGS. 3 through 8 are illustrations showing an example of display on a graphic display unit produced in each processing step in FIG. 2.

In the first step 18, when the operator enters a command and associated parameters for retrieving a 2-D wire-frame, the computational unit 2 in FIG. 1 operates to retrieve 2-D wire-frame data, which has been produced using a drawing system or the like, from the data base 6, and a figure (2-D wire-frame) carried by the data is displayed on the graphic display unit 3 (see FIG. 3).

Figure 4:
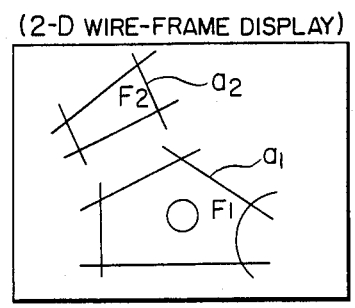

In the next step 19 when the operator enters the 2-D figure generating command and associated parameters, the computational unit 2 operates to transform the 2-D wire-frame data into data of figures (sets of line elements), and the figures (2-D figures) carried by the data are displayed on the graphic display unit (Identification numbers of the generated 2-D figures are also displayed on the CRT screen as shown in FIG. 4.).

In the next step 20 when the operator enters the 2-D coordinate system generating command and associated parameters, the computational unit 2 operates to produce data for forming a 3-D shape from the 2-D figure elements. A 3-D coordinate system generating command is a group of commands such as the x-axis, y-axis, z-axis, x11-axis, y11-axis and z11-axis commands, and the operator selects the x-axis command, for example, and enters data of origin and positive direction of coordinate axis, and subscripts ij representing the hierarchical level and identification number of the 3-D coordinate system given to the generation object (The hierarchy of the main coordinate system is expressed by subscripts 01.). In response to the entry of data for two sets of coordinate axes, data of 3-D coordinate system given to the generation object and tree structure which extends to the main coordinate system, as will be described later, is generated. At this time, the 2-D coordinate system entered by the operator is displayed on the stated positions of the 2-D figures on the graphic display unit (see FIG. 5). Entry of the 2-D coordinate system generating command is repeated until data of the tree structure with the main coordinate system at its summit completes.

Figure 6:
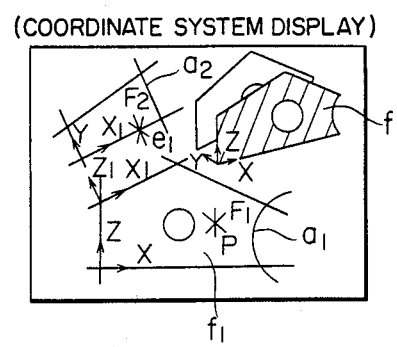

In the next step 21, a 3-D surface model is produced using the 2-D figure data having coordinate system element generated in the above process (FIG. 6).

In processing step 211 of the finite plane generating command, when the operator specifies an internal point on the finite plane expressed by the 2-D figure element displayed on the graphic display unit, or specifies a 2-D figure marked with a finite plane which is the object of 3-D transformation among the total of finite plane produced automatically in advance, the computational unit 2 operates to generate data of 2-D finite planes including a projection plane, section plane and development plane.

In the next step 212 when the operator enters a command relevant to the kind of the finite plane (projection plane, section plane or development plane) generated in the previous step 211 and associated parameters, the computational unit 2 operates to generate data of finite plane and thereafter data of the object 3-D plane using data of 2-D figure and 2-D coordinate system.

The 3-D plane data produced as described above is linked with data of 3-D line, 3-D plane and closed surface solid, and data of a well matched 3-D geometrical shape model is generated.

Subsequently, if it is intended to modify the generated 3-D plane with a development figure (2-dimensional), the sequence proceeds to step 24.

In step 24 when the operator enters the development figure generating command and associated parameters, the computational unit 2 operates to develop the 3-D surface element which has already been produced into 2-dimension, and data of 2-D figure element having a 2-D coordinate system element is generated. Furthermore, data of 2-D figure element generated by the auxiliary command is modified, and using the resulting 2-D figure element data, the above-mentioned finite plane generating and developed plane 3-D transforming commands generate data of object 3-D plane.

Figure 7:
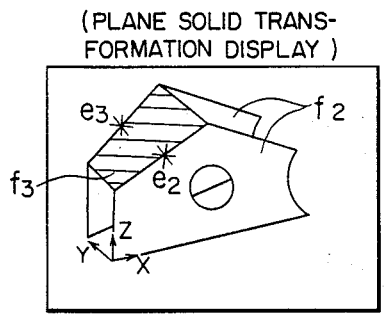

In the case of adding a 3-D plane element to an existing 3-D plane, the operator selects a command for the plane, cylinder or the like in the 3-D plane making process in step 23 and specifies 3-D points (vertexes) and line elements (ridges) constituting the generation object 3-D plane elements on the graphic display unit, and data of object 3-D plane element is generated (see FIG. 7).

The above processing steps 18–24 are repeated until all plane elements forming the object 3-D shape are produced.

These are the case of drawing an object 3-D shape as a set of 3-D plane elements. In order to enter the generated 3-D plane as a closed surface solid model (boundary expression model) to the computer, the direction of each plane element forming the 3-D surface model is rectified to a certain direction using the command for making a solid model from 3-D plane in step 25, and the 3-D plane model data is transformed into closed surface solid model data (see FIG. 8). In the case of transforming the closed surface solid model data back to 3-D plane model data, it is implemented using the command for making 3-D plane from solid model (In this case, plane elements have the same direction, but data is described as a 3-D plane model in the computer, allowing command processing in units of plane element such as the deletion of a plane element.).

The 3-D shape data generated in the above command processing steps is stored in the 3-D shape data base by the shape registering command in step 26.

B2. EXAMPLE OF CRT DISPLAY

The processings of FIG. 2 for a specific model will be described using displayed pictures on the CRT screen shown in FIGS. 3–8.

A 2-D wire-frame display in FIG. 3 is derived from 2-D wire-frame a retrieved from the data base 6 (FIG. 1) in the processing step 18 in FIG. 2.

A 2-D figure display in FIG. 4 shows the 2-D figure elements F1 and F2 generated in the processing step 19 in FIG. 2, and symbols a1 and a2 in the figure indicate that the elements were generated by dividing the 2-D wire-frame a in the 2-D wire-frame display of FIG. 3.

Figure 5:
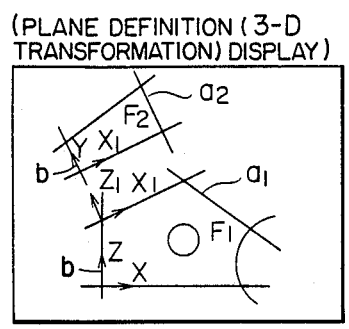

A coordinate system display in FIG. 5 shows the 2-D coordinate system generated in the processing step 20 in FIG. 2, indicating that a 2-D coordinate system b is given to the 2-D figure elements F1 and F2 in the 2-D figure display of FIG. 4.

A surface definition (3-dimension) display in FIG. 6 shows that a finite plane f1 (shown by hatching; in this case f1 is a projection plane) is extracted by designating an internal point p on the finite plane expressed by the 2-D figure element F1 or designating a specific figure marked with automatically generated finite plane in the processing step 211 in FIG. 2, and a 3-D plane element f is generated by designating a wire-frame element e11 which belongs to the 2-D figure element F2 indicative of as to which plane the finite plane f1 results from by projection.

A surface definition (3-dimension) display in FIG. 7 shows the process of generating a new 3-D plane element f3 (shown by hatching) by designating two 3-D line elements e2 and e3 forming the already produced two 3-D plane elements f2 in the processing step 23 in FIG. 2. The generated 3-D plane element f3 is produced through the mapping to the 2-D space depending on the type of interporation (plane, cylinder, free curving surface, etc.) specified through the command selection by the operator, production of 2-D boundaries by the linear interpolation in this space, and the inverse-mapping of the result to the 3-D space.

Figure 8:
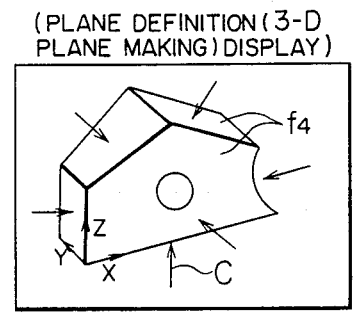

A plane solid display in FIG. 8 depicts the processing of step 25 in FIG. 2, and it shows the process of generating a solid model by merging the total f4 of 3-D plane elements forming the generation object solid model among composing elements (3-D elements) of the 3-D model in direction c indicative of the real side of the solid object.

Next, the processings of generating 2-D figure data, transforming 2-dimension into 3-dimension, and generating data of 3-D plane model, all in a hierarchical relationship featured by the present invention, will be described in detail with reference to FIGS. 9–16.

Figure 9:
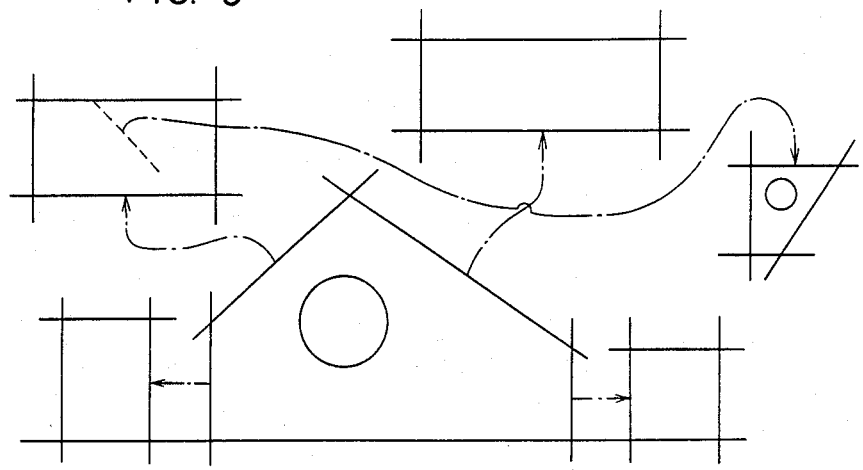
FIGS. 9 through 16 are illustrations showing an example of display on a graphic display unit for explaining the features of the 3-dimensional stereographic shape generation system embodying the present invention.
Figure 10:
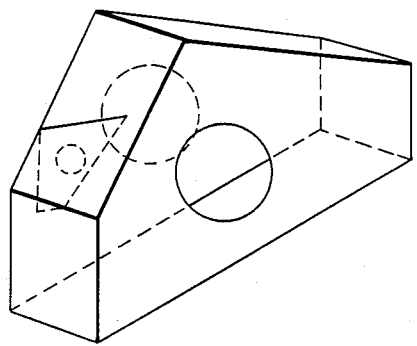

FIG. 9 shows an example of 2-D wire-frame produced by a drawing system in order to draw a 3-D shape of FIG. 10. In FIG. 9, 2-D figures expressing plane elements of the 3-D shape in FIG. 10 are displayed at arbitrary positions in an arbitrary scale, and they are not drawn in the strict third angle system.

Figure 11:
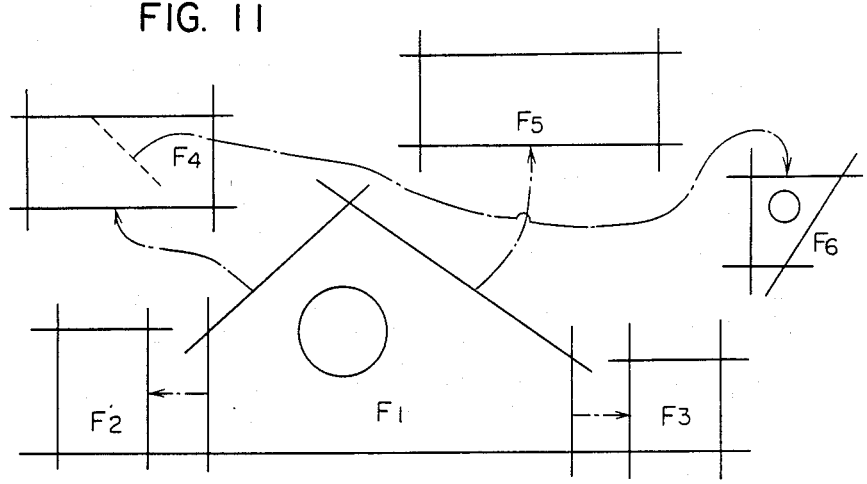

The inventive shape modeling system divides the 2-D wire-frame (FIG. 9) into six 2-D figure elements F1–F6 as shown in FIG. 11 (processing step 19 in FIG. 2).

Figure 12:
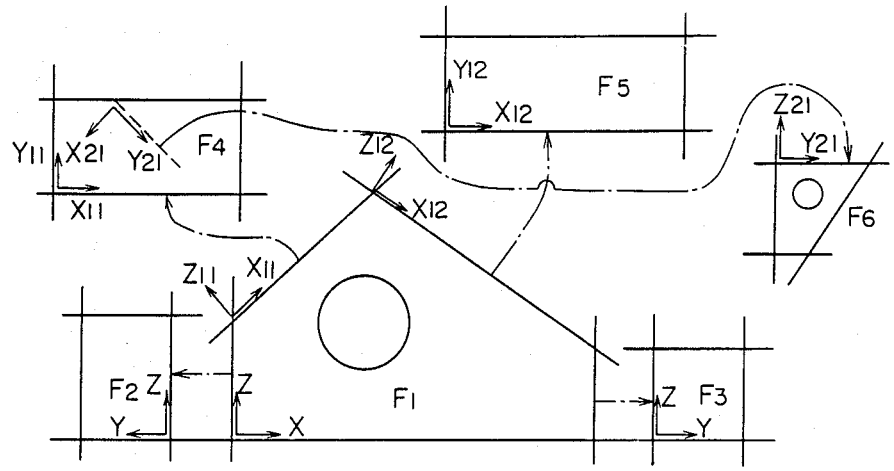

The six 2-D figure elements F1–F6 are given nine 2-D coordinate system elements as shown in FIG. 12 (processing step 20 in FIG. 2).

Next, using these 2-D figure elements, the process of generating a 3-D plane model is carried out. Initially, only 2-D wire-frames forming finite planes as the object of 3-D transformation are extracted from among the 2-D wire-frames (FIG. 12), and finite planes are generated (processing step 211 in FIG. 2). Next, the generated finite planes including a projection plane, section plane, rotation plane, etc. are transformed into 3-dimension (processing step 212 in FIG. 2).

Figure 13:
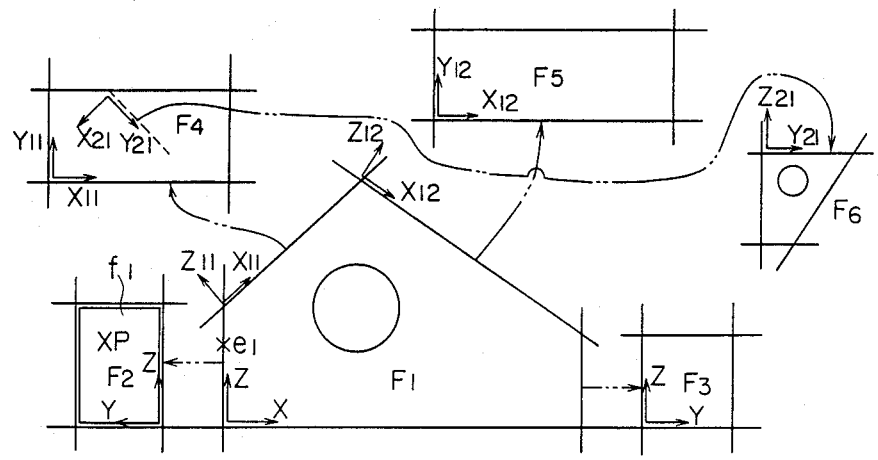
Figure 14:
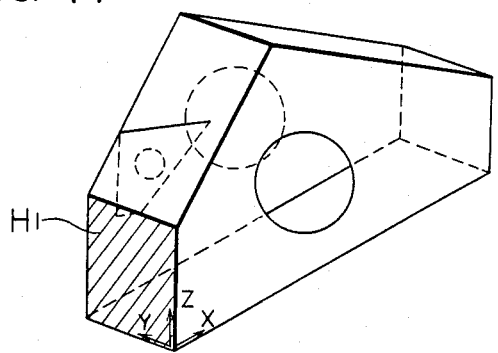
Figure 15:
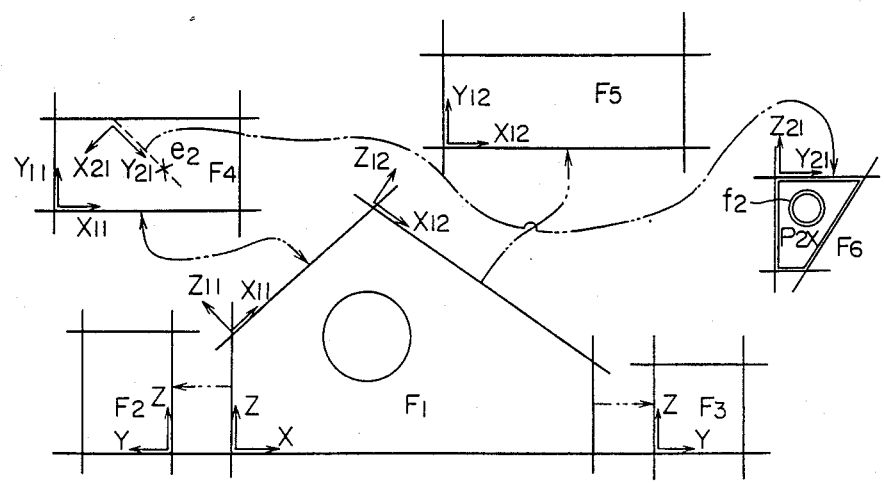
Figure 16:
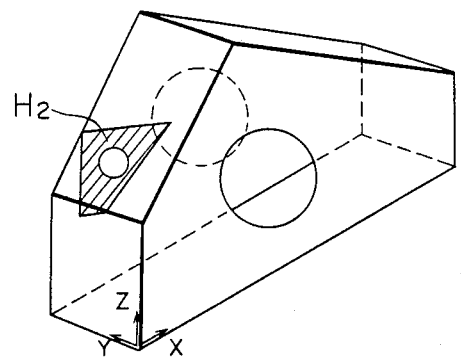

FIGS. 13 and 14 show the process of 3-D transformation for a portion H1 shown by hatching in FIG. 14. The operator initially selects a certain command to designate an arbitrary internal point p on the finite plane f1 which is a 2-D version of the plane element H1, so that only a 2-D wire-frame forming the finite plane f1 is extracted from 2-D wire-frames of the 2-D figure F2. The operator designates the 2-D wire-frame element e1 of the 2-D figure F1 indicative of as to which plane of the 3-D shape the extracted finite plane f1 resulted from by projection. This command input method can equally be applied to other 2-D figure elements in a hierarchical relationship. For example, as shown in FIGS. 15 and 16, in order to generate a plane element H2 (shown by hatching), the operator selects a certain command to designate an arbitrary internal point p2 on the finite plane f2 which is a 2-D version of the plane element H2, and then designates the 2-D wire-frame element e2 of the 2-D figure F4 indicative of as to which plane of the 3-D shape the extracted finite plane f2 resulted from by projection.

C. 3-D SHAPE GENERATING PROCESS ALGORITHM

The following describes the process algorithm of generating data of 2-D figure model by the command processing described in the previous paragraph B, and generating data of 3-D shape using the above resulting data, for the case of the interactive operating system which imposes less load to the computer.

C1. 2-D FIGURE MODEL GENERATING PROCESS ALGORITHM

Figure 19:
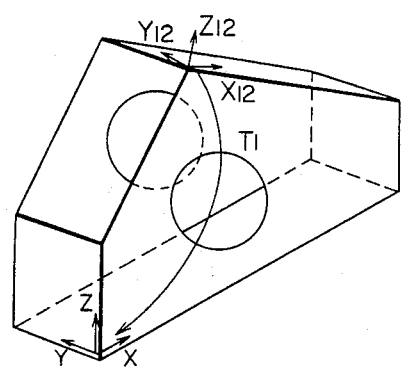
Figure 20:
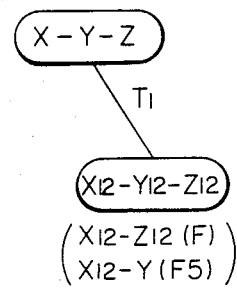

The coordinate system generating process algorithm of the processing step 20 in FIG. 2 will be described with reference to the flowchart of FIG. 17 and illustrations of FIGS. 18, 19 and 20.

Figure 17:
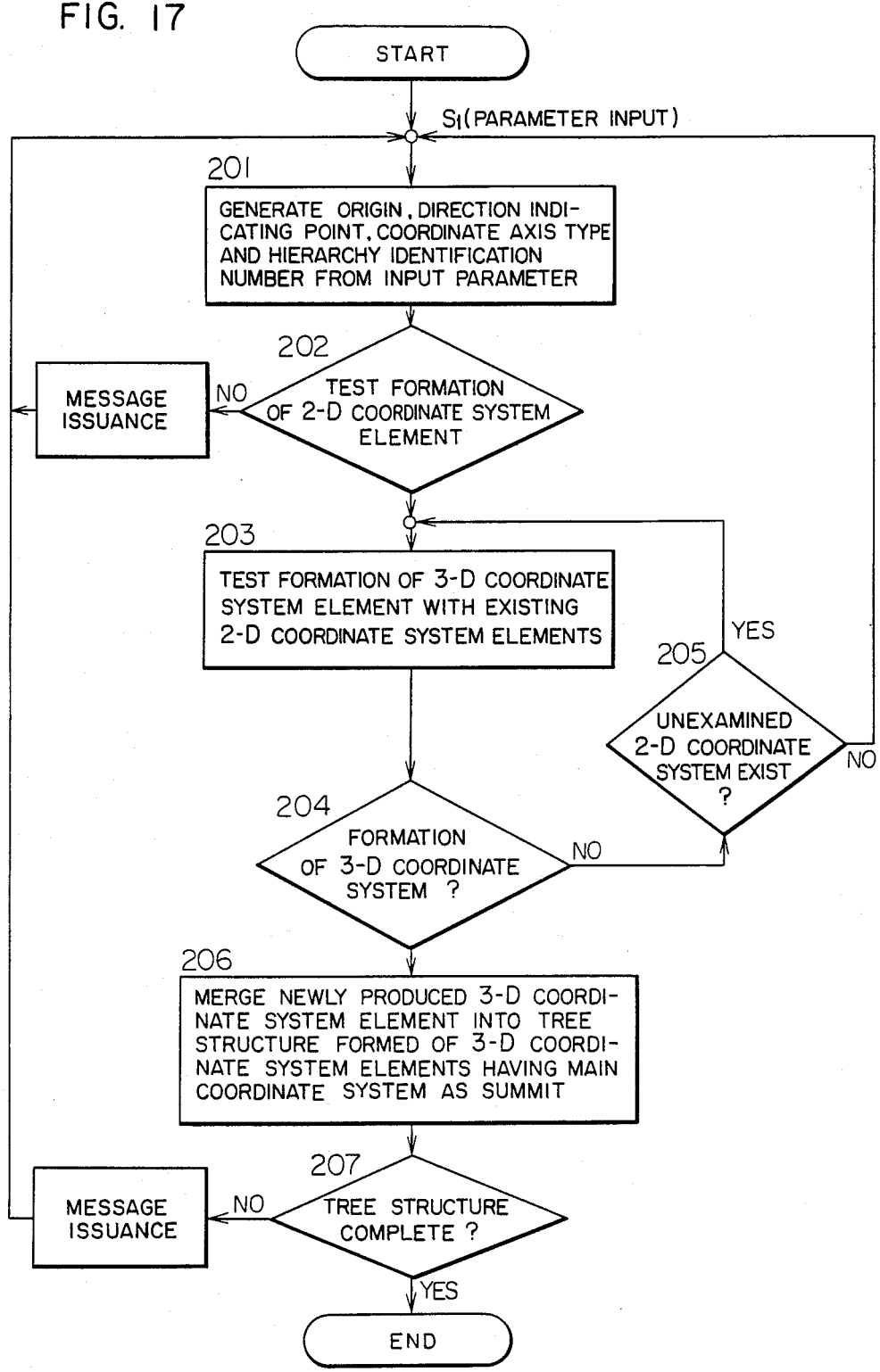
FIG. 17 is a flowchart showing the process algorithm of generating coordinate system data of the case where the operator enters 2-dimensional coordinate system element directly onto a 2-dimensional wire-frame figure.
Figure 18:
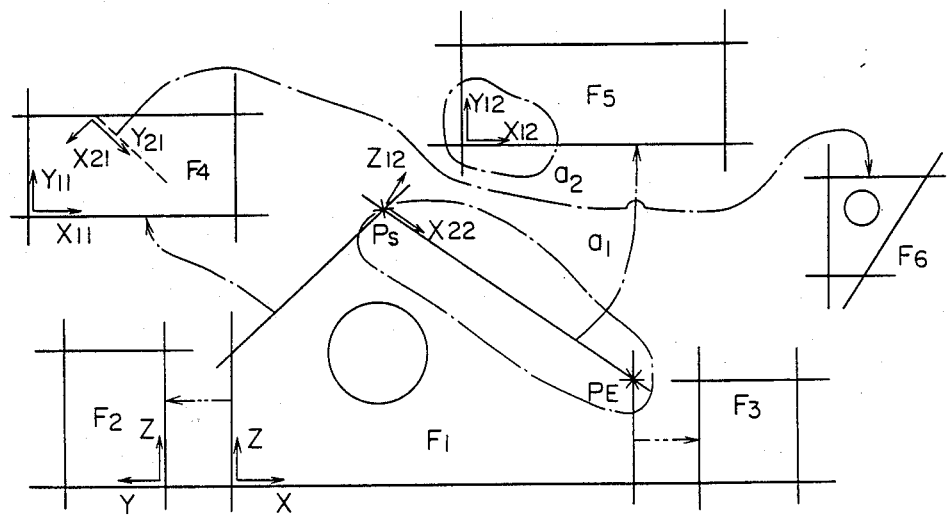
FIGS. 18, 19 and 20 are illustrations used to explain the steps of process shown in FIG. 17.

The first step 201 of FIG. 17 generates data, as shown by a1 in FIG. 18, an origin $P_S$ of a coordinate axis, a direction designation point $P_E$ indicative of the axis direction from the origin $P_S$, the type of coordinate axis such as x, y or z, and subscripts i and j of 3-D coordinate system elements having a tree structure basing on the parameters entered by the operator at $S_P$ (In the example of a1 in FIG. 18, the coordinate axis element type is x, hierarchical level is $i=1$, and the same hierarchical level has an identification number of $j=2$.).

The next step 202 tests as to whether a 2-D coordinate system element is formed by the combination of the already produced coordinate axis element on the object 2-D figure element and the coordinate axis element generated in the processing step 201. This test process examines as to whether two coordinate axis elements share the origin and intersect at right angles, whether the types of the two coordinate axis elements meet the compositional condition of 2-D coordinate system elements such as x-y, and whether the two coordinate axis elements have an equal hierarchical level i and unequal identification numbers j. If no 2-D coordinate system element is formed, the state $S_P$ before entry of parameters is restored with a message indicative of the affair being issued. If a 2-D coordinate system element is formed, a test is made as to whether it do not coincide with an already produced coordinate system element. In case of the coincidence between the 2-D coordinate system element and already produced 2-D coordinate system element, a message of operator input error or the like is issued with the entry of the first axis of the 2-D coordinate system, for example, and the sequence is returned to the state $S_P$ before entry of parameters. In case the 2-D coordinate system element do not coincide with any already produced 2-D coordinate element, a 2-D coordinate system element in connection with the 2-D figure element is generated. In the example of a1 in FIG. 18, data of an entered coordinate axis element x12 generates, in conjunction with an already produced coordinate axis element z12, data of 2-D coordinate system element x12-z12 on the 2-D figure element F1 in the processing steps 201 and 202 of FIG. 17.

The subsequent processing steps 203–205 test as to whether the 2-D coordinate system element generated as described above and the already produced 2-D coordinate system element in conjunction form a 3-D coordinate system element (a 3-D coordinate system element representing a unique main coordinate system or local coordinate system). If the processing steps 203 and 204 reveal that no 3-D coordinate system element is formed, the step 205 manages to repeat the processing steps 203 and 204 for testing the formation of a 3-D coordinate system element against all 2-D coordinate system elements which belong to all 2-D figure elements other than that to which the newly generated 2-D coordinate system element belongs. If the process result reveals that the new 2-D coordinate system element does not form a 3-D coordinate system element in conjunction with any already produced 2-D coordinate system element, the sequence returns to $S_P$ before entry of parameters. If a 3-D coordinate system element is formed, the next processing step 206 takes the resulting 3-D coordinate system element having a 3-D transformation matrix into a tree structure (3-D coordinate system) formed by 3-D coordinate system elements with its summit formed by the already produced main coordinate system (3-D coordinate system elements). In the example of FIG. 19, the newly produced 2-D coordinate system element x12-z12 forms, in conjunction with a 2-D coordinate system element x12—y12 (or y) indicated by a2 which has already been produced in a 2-D figure element F5, a local 3D coordinate system element x12—y12 (or y)—z12. The main coordinate system x—y—z is made up in combination of a 2-D coordinate system element x—z on a 2-D figure F1 and a 2-D coordinate system element y—z on a 2-D figure F2, and in the stage of formation of the local 3-D coordinate system element x12—y12 (or y)-z12, transformation data (3-D coordinate transformation matrix) for making the local 3-D coordinate system element x12—y12 (or y)—z12 into the main coordinate system x—y—z can be produced, as shown in FIG. 19. In this stage, the main coordinate system x—y—z and the local 3-D coordinate system element x12—y12 (or y)—z12 generate a tree structure as shown in FIG. 20. In the example of FIG. 20, the newly produced local 3-D coordinate system element x12—y12 (or y)—z12 makes a linkage only with the already produced main coordinate system x—y—z (upward branching), but in usual merging into an already produced 3-D coordinate system, branching in both upward and downward directions takes place (step 206 of FIG. 17). At this time, if the tree structure composed of 3-D coordinate system elements is incomplete, it is notified to the operator on a CRT message, and the sequence returns to $S_P$ before entry of command.

In this way, 3-D coordinate system elements are produced from parameters entered by the operator, and a tree structure is produced from these elements.

A series of processings shown as steps 201–207 in FIG. 17 are repeated until the intended tree structure is completed, and the processing step 20 in FIG. 2 of the coordinate system data generation process is implemented.

C2. 3-D SHAPE GENERATION PROCESS ALGORITHM

The following describes an example of the process algorithm for generating data of 3-D shape using data of 2-D figure generated by the process algorithm described in the previous paragraph C1.

The algorithm of plane definition process of step 21 in FIG. 2 will be described with reference to the flowchart of FIG. 21 and illustrations of FIGS. 22–26.

Figure 21:
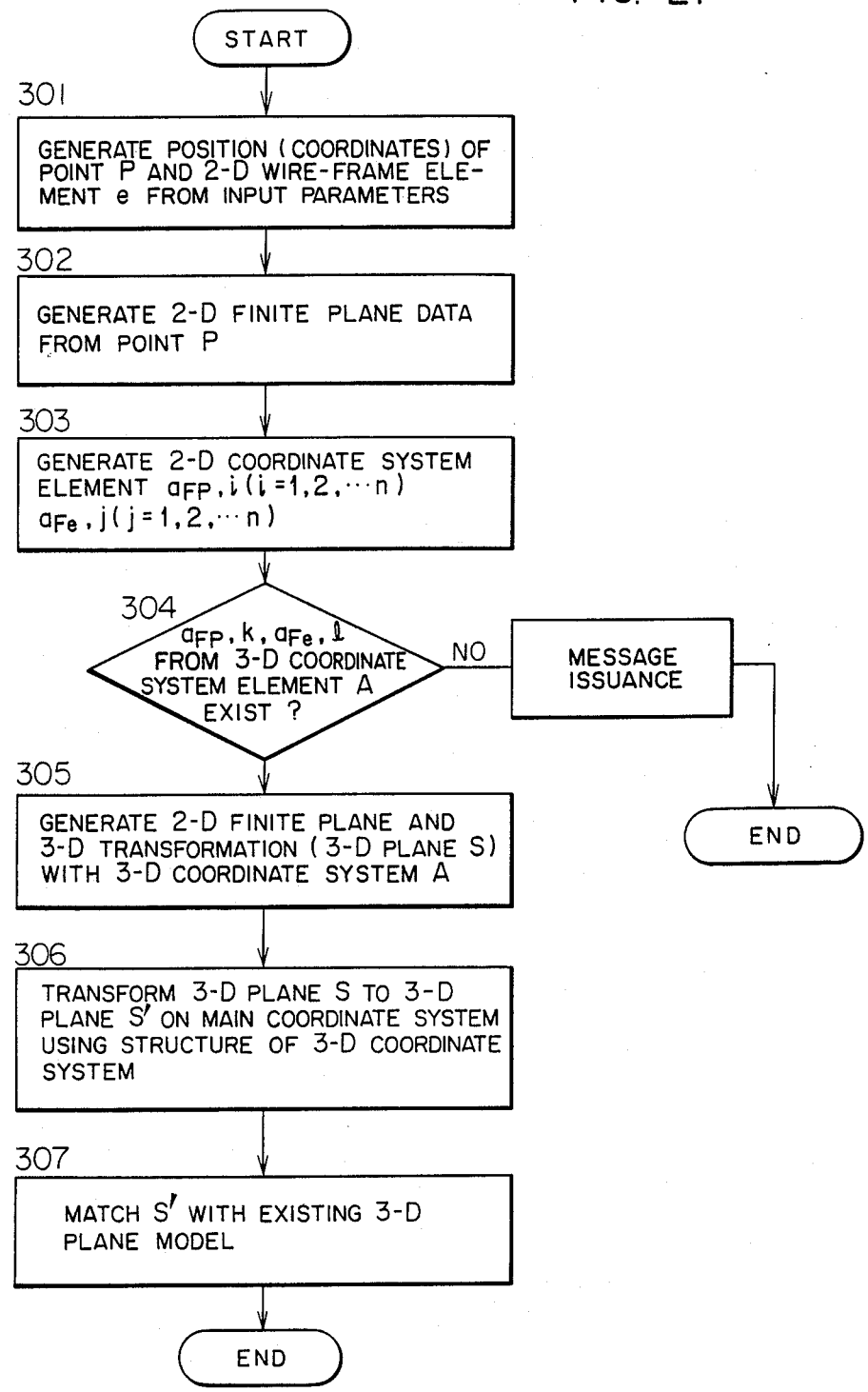
FIG. 21 is a flowchart showing the process algorithm for generating a 3-dimensional stereographic shape using coordinate system data.
Figure 22:
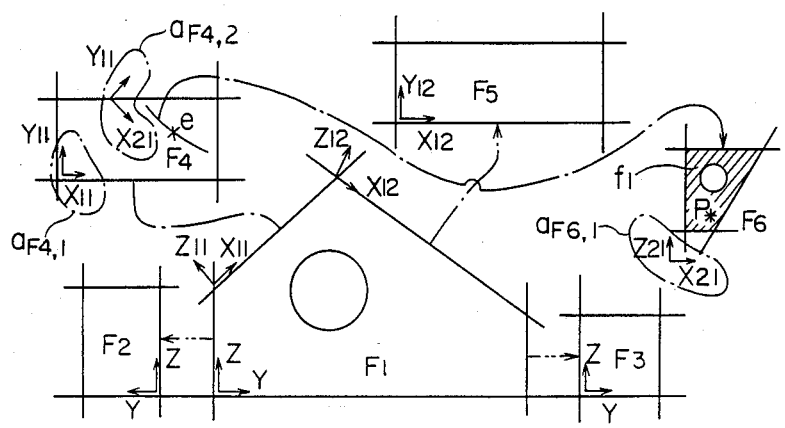
FIGS. 22 through 26 are illustrations used to explain the steps of process shown in FIG. 21.

The first processing step 301 in FIG. 21 responds to the command selection and parameter input by the operator to generate data at an arbitrary point p (coordinates on the drawing coordinate system) on a 2-D finite plane expressing a generation object 3-D plane (will be termed "generation object 2-D finite plane") and data of 2-D wire-frame element e indicative of as to which plane the generation object 2-D finite plane resulted from by direct projection, as shown in FIG. 22.

The next processing step 302 generates data of 2-D figure element $F_P$ to which the line element on the boundary of the generation object 2-D finite plane belongs and of a generation object 2-D finite plane $f_P$ from data generated in the processing step 301 for the internal point p on the generation object 2-D finite plane and the 2-D wire-frame element e. In the example of FIG. 22, data of 2-D figure element F6 and generation object 2-D finite plane f1 is generated.

Processing step 303 generates the total of 2-D coordinate system elements {a $F_P$, i; i=1, 2, . . . , n} which belong to the 2-D figure element $F_P$ generated from point P in the processing step 302 and the total of 2-D coordinate system elements {a Fe, j; j=1, 2, ..., m} to which the 2-D wire-frame element e belongs. In the example of FIG. 22, the total of 2-D coordinate system elements {a F6, 1} (only one in this example) which belong to the 2-D figure element F6 generated from point P and the total of 2-D coordinate system elements {a F4, 1, a F4 2} which belong to the 2-D figure element F4 to which the 2-D wire-frame element e belongs are generated.

Figure 23:
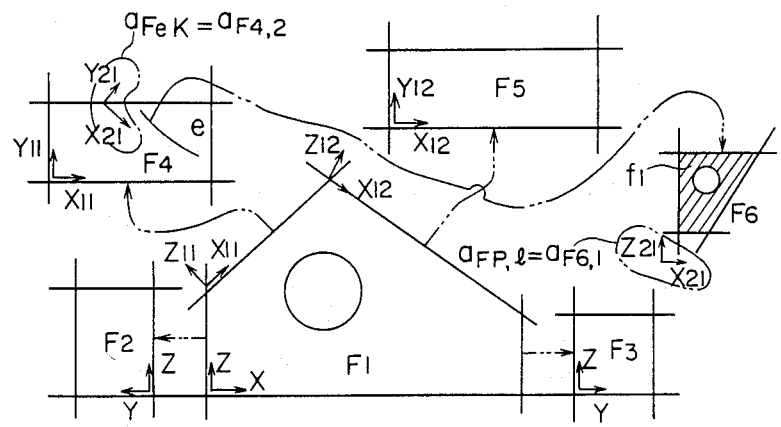

The next processing step 304 tests as to whether a unique set of 2-D coordinate system elements (a $F_P$, k, a Fe, l) forming a 3-D coordinate system element exists in the two sets of 2-D coordinate system elements. If the 2-D coordinate system element set forming such a 3-D coordinate system element is absent, the process is terminated with an error message being issued to the operator indicative of the infeasibility of continuing the 3-D transforming process. In the example of FIG. 23, the 2-D coordinate system elements a F6, 1 and a F4, 2 in combination form a 3-D coordinate system element x21—y21—z21, and therefore the processing step 304 provides the result a $F_P$, k=a F6 and a Fe, l=a F4, 2.

Figure 24:
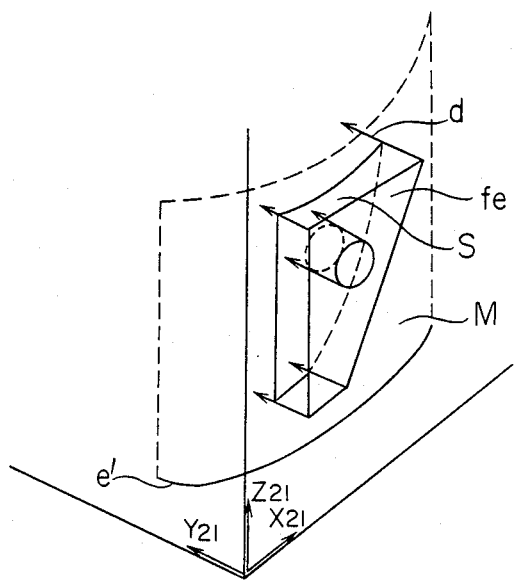

The next processing step 305 generates a generation object 3-D plane S using data of the 3-D coordinate system element A, generation object 2-D finite plane f1 and 2-D wire-frame element e obtained in the above processings. The generated 3-D plane S is a local 3-D space to which the generation object 3-D plane S belongs unless the 3-D coordinate system element A is a main coordinate system element. Generation of the generation object 3-D plane S in this local 3-D space is as follows. Using two 2-D coordinate system elements a $F_P$, k and a Fe, l forming the 3-D coordinate system element A, the generation object 2-D finite plane f1 and the curving surface expressed by the 2-D wire-frame element e are transformed into the local 3-D coordinate system A, and a 2-D finite plane $f_e$ and curving surface M are generated, respectively. The generation object 3-D plane S is generated by directly projecting the $f_e$ to the M on the local 3-D coordinate system A. In the example of FIG. 24, 2-D coordinate system elements x21—z21 and y21—z21 forming the 3-D coordinate system element x21—y21—z21 are used to generate the 2-D finite plane $f_e$ from the generation object 2-D finite plane f1 and the curving surface M from a 2-D wire-frame element e' (the 2-D wire-frame element e transformed into the 2-D coordinate system x21—y21). The generation object 3-D plane S is generated by directly projecting the $f_e$ on to the curving surface M along the direction d on the 3-D coordinate system x21—y2-1—z21.

Figure 25:
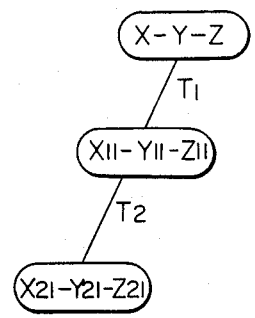

Processing step 306 transforms the generation object 3-D plane S on the local 3-D coordinate system generated in the previous step 305 into a 3-D plane S' using the 3-D coordinate system element A and the tree structure of 3-D coordinate system elements which has been generated in step 20 in FIG. 2 of coordinate system generation. This transformation is implemented as follows. It is tested as to which position of the already produced tree structure of 3-D coordinate system elements is the 3-D coordinate system element A located. In case the 3-D coordinate system element A is other than the main coordinate system, the generation object 3-D plane S' on the main coordinate system is generated using data which is included in each element of the 3-D coordinate system (tree structure) for converting it to the main coordinate system. In the example of FIG. 25, the 3-D coordinate system x21—y21—z21 on which the generation object 3-D plane S was generated in FIG. 24 has the second hierarchical level in the tree structure of 3-D coordinate system elements, and in order to generate the generation object 3-D plane S' through the transformation of the generation object 3-D plane S to the main coordinate system x—y—z, multiplications of the transformation matrices are applied to the S in the order to Il2 and Il1.

Figure 26:
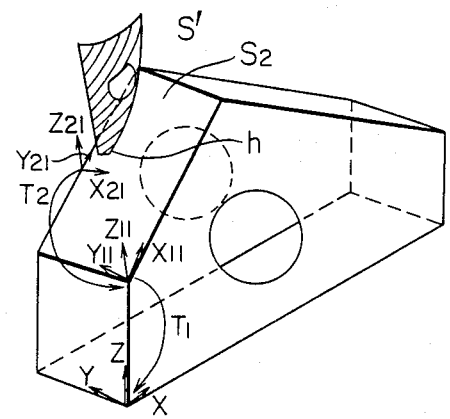

The generation object 3-D plane S' on the main coordinate system x—y—z generated in the above processing steps is matched with data of the already produced 3-D plane model in the processing step 307, and the resulting data of 3-D plane model is stored in the data base. In the example of FIG. 26, the newly generated 3-D plane S' is in contact with a 3-D plane S2 of the already produced model, and a line element h which constitutes the shape line of the 3-D plane S' is at the same time a line element on the S2 plane (i.e., the line element h is shared by the 3-D planes S1 and S2).

Through the iterative use of the above 3-D plane generation commands, the operator generates data of intended generation object shape (3-D planes) in the data base.

D. DATA MODEL

The following describes a data model and its logical structure of the 2-D wire-frame figure which enables the foregoing processings.

Figure 27:
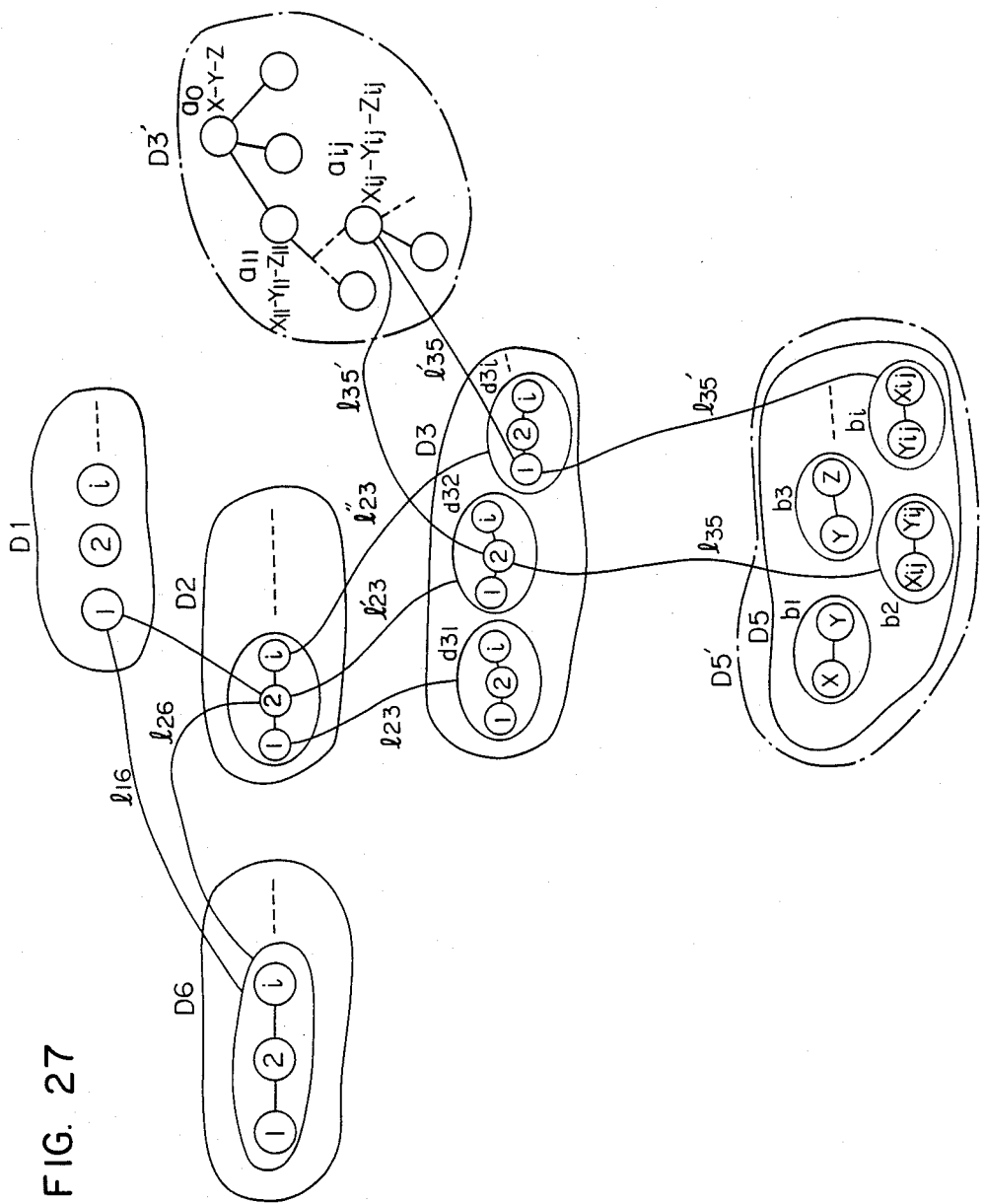
FIG. 27 is a diagram showing the logical structure of data of 2-dimensional drawing and data of 2-dimensional wire-frame figure.

FIG. 27 shows a data model and its logical structure for the 2-D wire-frame figure. In the figure, symbol D1 denotes a drawing, D2 denotes a 2-D figure, D3 denotes a 2-D coordinate system, D3' denotes a 3-D coordinate system, D5 denotes coordinate axes, D5' denotes the internal expression of D5, and D6 denotes a 2-D wire-frame (For easy understanding, the model is named consistently with the figure on the CRT screen.).

The drawing Dl located at the top of FIG. 27 consists of a plurality of drawing elements, and each drawing element represents a piece of drawing used in a design office. (The drawing identification number of D1, e.g., ① of D1, signifies a drawing element.)

A drawing element forming D1 consists of 2-D figure elements forming D2 and 2-D line elements forming D6. Drawing elements include data of drawing coordinate system, 2-D figure elements include data of magnification, and 2-D line elements include data of equations of line elements.

A 2-D figure element forming D2 consists of a 2-D line element forming D6 and 2-D coordinate system elements forming D3.

A 2-D coordinate system element forming D3 consists of a coordinate axis element forming D5 (one having two sets of coordinate axes for its composing elements, e.g., it is bi of D5 in FIG. 27) and a 3-D coordinate system element forming D3'.

A 3-D coordinate system forming D3' has, in the internal expression of D3, one main coordinate system and local coordinate systems as its composing element, and the total of the composing elements forms a tree structure having its summit at a (x—y—z) of D3' in FIG. 27. Local coordinate systems (3-D coordinate system elements) include data of 3-D transforming matrices which extend to higher order 3-D coordinate systems. Two sets of 2-D coordinate system elements which belong to different 2-D figures and form 2-D coordinate systems of D3 are in correspondence to a 3-D coordinate system element of D3' (e.g., ② of d32 and ① of d3i of D3 correspond to a 3-D 3 coordinate system element $a_{ij}$ ($x_{ij}$—$y_{ij}$—$z_{ij}$) of D3').

D5' has, in the internal expression of D5, a coordinate axis element as its composing element, and a coordinate axis element of D5' corresponds to one of two sets of coordinate axes forming the coordinate axis element of D5.

Next, the process of generating data expressing the above-mentioned model implemented in the pressing steps of FIGS. 1 and 2 will be described.

First, the basic processing of FIG. 1 will be described.

The 2-D wire-frame generation processor 9 in FIG. 1 produces a drawing D1, data of 2-D wire-frame D6 and linkage data for them (at this time identification numbers of composing elements of D1 link up to line elements of D6), and the resulting data is stored in the drawing data base 6.

The 2-D figure generation process 10 and coordinate system generating process 11 in FIG. 1 produce data of 2-D wire-frame figures (the whole data shown in FIG. 27), and it is stored in the 2-D wire-frame figure data base 7.

Next, each processing step of FIG. 2 will be described.

The 2-D figure generation processing step 19 in FIG. 2 produces data of 2-D figure elements of D2 which belong to elements of drawing D1 (linkage data for the 2-D figure elements and drawing elements including them, and for example it is data of linking element I12 in FIG. 14), and data of line elements which belong to the 2-D figure elements (linkage data for the line elements which belong to D6 and the 2-D figure elements, and it is for example data of linking element I26 in FIG. 27).

The 2-D coordinate system generation processing step 20 in FIG. 2 produces data of 2-D coordinate system elements of D3 which belong to one 2-D figure element and associated linkage data (linkage data for 2-D coordinate system elements which belong to D3 and 2-D figure elements including them, and it is for example data of linking element I23 for ① of D2 and d31 of D3 in FIG. 27), data of coordinate axis elements of D5 which belong to the 2-D coordinate system elements and associated linkage data (linkage data for two sets of coordinate axes and 2-D coordinate system elements including them, and it is for example data of linking element I35 for ② of d32 of D3 and b2 of D5), and data of 3-D coordinate system elements of D3' and associated linkage data (linkage for 3-D coordinate system elements and 2-D coordinate system elements of D3, and it is for example data of linking element I35').

Figure 28:
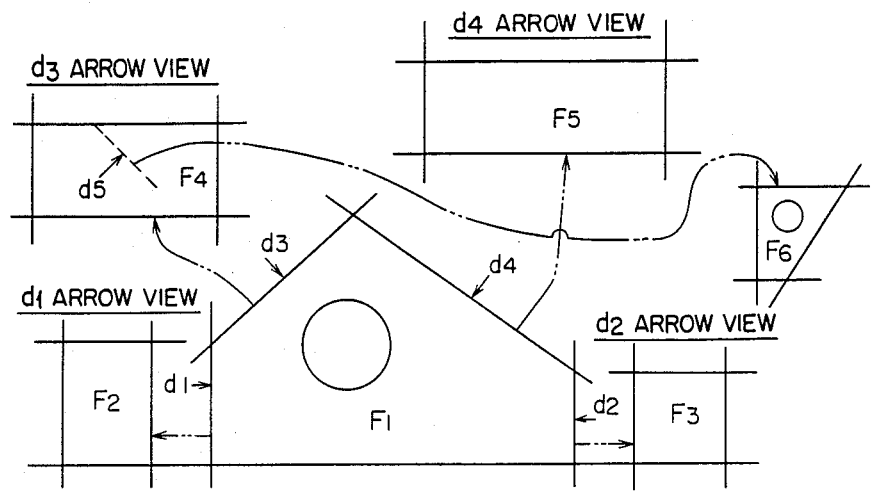
FIGS. 28 and 29 are illustrations used to explain the method of automatically generating coordinate system data from commentary data in the 2-dimensional wire-frame figure data.
Figure 29:
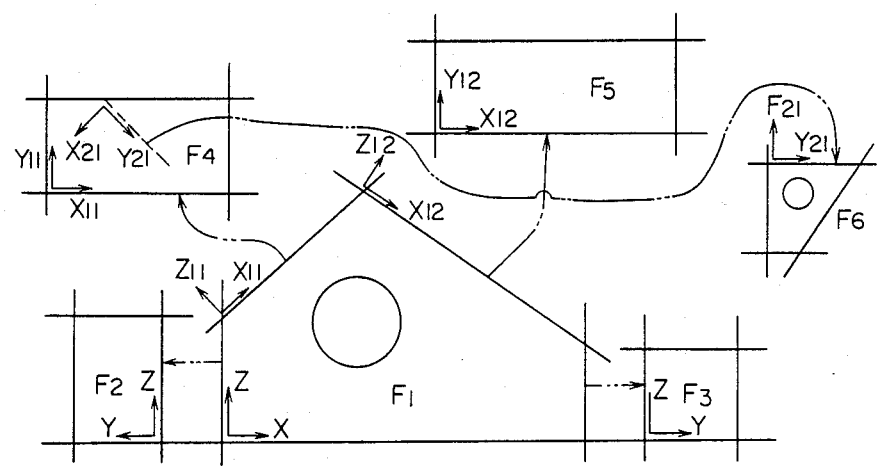

The foregoing embodiment of this invention is a shape modeling system for generating a 3-D figure, in which the operator directly enters coordinate axis elements forming 2-D coordinate system elements on a 2-D figure to generate coordinate system data. 2-D figure data generated by a drawing system is generally appended with information as commentary data in the form of XXX arrow view, YYY cross-sectional view and the like indicative of as to which portion of the 3-D stereographic shape each 2-D figure element represents, and the designer constructs a 3-D shape in his brain basing on the information. On this account, these comments must be given in an authoritative form in order to express 3-D shape correctly. This means that these commentary data are a different expression of information which is equivalent to coordinate system data described above, and it means that commentary data on 2-D figures produced by a drawing system can be transformed into 2-D coordinate system elements. Accordingly, if commentary data is given on a 2-D figure, it becomes possible to generate a 3-D figure using the 3-D figure generation process described in the above embodiment (i.e., instead of direct input of 2-D coordinate system elements by the operator for the coordinate system data generation process in step 20 of FIG. 2, the data is produced by transformation from commentary data). FIG. 28 shows the example that commentary data is given in the form of arrow views above 2-D figure elements of a 2-D wire-frame, and FIG. 29 shows the result of generation of 2-D coordinate system element data (2-D coordinate system elements, 3-D coordinate system elements and their tree structure) using the commentary data of FIG. 28 by the computational unit.

In this embodiment, coordinate system data necessary for producing a 3-D shape from 2-D figures is generated by providing coordinate axes on the 2-D figures, and this allows the direct use of 2-D wire-frame data produced in a complex expression by a drawing system and, in addition, the same command input method for the case of a simple figure and the case of a complex figure in generating 2-D figures.

Consequently, the system is versatile enough to deal with 2-D wire-frame data draw by a drawing method which does not allow conventional methods to generate a 3-D shape, and moreover the 3-D shape generation process is implemented in an invariable procedure irrespective of the complexity of the object 3-D shape, thereby realizing an interactive operating shape modeling system with a satisfactory man-machine interfacing performance.

The inventive system allows effective use of data of design drawings, which have already been produced in the 2-D figure drawing method and by a drawing system basing on the mechanical drawing standard familiar to designers, as basic data for producing 3-D shape data, whereby it is effective for the enhancement of the man-machine interfacing performance.

We claim:

1. A shape modeling method for generating a three dimensional shape, said method comprising the steps of:
    generating data of a two-dimensional figure and a two-dimensional coordinate system through an input means using a computational device;
    storing said two-dimensional figure and said two-dimensional coordinate system data in a data base;
    transforming said two-dimensional coordinate system retrieved from said data base into a three-dimensional coordinate system;
    generating a three-dimensional shape from said two-dimensional figure data and said three-dimensional coordinate system;
    wherein said two-dimensional figure and said two-dimensional coordinate system data includes two-dimensional figure elements and two-dimensional coordinate system elements;
    wherein an element of said two-dimension coordinate system which belongs to a two-dimensional figure element is made to be a master element and other elements are made to be slave elements; and
    wherein said master element includes general data to which said slave elements are hierarchically related.

2. A shape modeling method according claim 1, wherein data of a two-dimensional figure element includes data of a tree structure level in a three-dimensional coordinate system; and
    wherein two two-dimensional elements correspond to an element in said three-dimensional coordinate system.

3. A shape modeling system method according to claim 1, wherein said data of two-dimensional coordinate system elements corresponds to data of three-dimensional coordinate system elements forming a tree structure; and
    wherein two two-dimensional coordinate system elements correspond to a three-dimensional coordinate system element.

4. A shape modeling method according to claim 1, wherein said method further comprises the steps of:
    initially generating data of a two-dimensional wireframe; and subsequently generating data of a two-dimensional figure by appropriately dividing said two-dimensional wire-frame data.

5. A shape modeling method according to claim 1, wherein said method generates data of said two-dimensional coordinate system by establishing an origin of a coordinate axis and another point indicating the direction of the axis, and subsequently entering data of a hierarchical level of three-dimensional coordinate system elements expressed in a tree structure.

6. A shape modeling method according to claim 1, further comprising the steps of:
- initially generating data of a two-dimensional wire-frame;
- storing said two-dimensional wire-frame data in said data base; and
- subsequently generating data of said two-dimensional coordinate system automatically from said data of said two-dimensional wire-frame.

7. A shape modeling method according to claim 1, wherein said method further comprises the steps of:
- initially generating a sweep figure using data of said two-dimensional figure and said two-dimensional coordinate system retrieved from the data base; and
- subsequently, generating data of an object in said data base by sequentially transforming said generated sweep figure into the space of a main coordinate system.

8. A shape modeling method according to claim 7, wherein said method further comprises the steps of:
- initially generating a cross-sectional figure in the space of a local coordinate system using said data of said two-dimensional figure and said two-dimensional coordinate system retrieved from said data base; and
- subsequently generating data of an object by sequentially transforming said generated cross-sectional figure into the space of said main coordinate system.

9. A shape modeling method according to claim 1, wherein said method further comprises the steps of:
- initially generating a development figure in the space of a local coordinate system using said data of two-dimensional figure and said two-dimensional coordinate system retrieved from said data base; and
- subsequently generating data of an object by sequentially transforming said generated development figure into the space of a main coordinate system.

* * * * *